United States Patent [19]

Odessky et al.

[11] Patent Number: 5,732,898

[45] Date of Patent: Mar. 31, 1998

[54] CORD REEL ASSEMBLY

[75] Inventors: Bruce Odessky, Buffalo Grove; Randolph M. Layton, Bolingbrook, both of Ill.

[73] Assignee: GTE Airfone Incorporated, Oak Brook, Ill.

[21] Appl. No.: 582,606

[22] Filed: Jan. 3, 1996

[51] Int. Cl.⁶ ........................................ B65H 75/48
[52] U.S. Cl. ............... 242/377; 242/379.2; 242/397.1; 242/399; 191/12.2 R
[58] Field of Search ............................ 242/377, 378, 242/378.1, 378.2, 378.3, 378.4, 379, 379.2, 397.1, 399, 404, 615.3; 191/12.2 R, 12.4

[56] References Cited

U.S. PATENT DOCUMENTS

| | | | |
|---|---|---|---|
| 1,470,183 | 10/1923 | O'Brien | 242/377 |
| 2,250,171 | 7/1941 | Wilkins | 242/377 |
| 2,821,453 | 1/1958 | Jessen | 312/223 |
| 2,821,579 | 1/1958 | Benjamin | 191/12.4 |
| 2,937,396 | 5/1960 | Momberg et al. | 15/323 |
| 3,093,341 | 6/1963 | Meletti | 242/379 |
| 3,617,659 | 11/1971 | Freeman | 191/12.2 |
| 3,657,491 | 4/1972 | Ryder et al. | 191/12.2 R |
| 3,705,962 | 12/1972 | Banister | 191/12.4 |
| 3,773,987 | 11/1973 | Davis et al. | 191/12.4 |
| 3,782,654 | 1/1974 | Kasa | 191/12.2 R |
| 3,812,307 | 5/1974 | Wagner et al. | 200/52 R |
| 3,858,011 | 12/1974 | Salvin et al. | 191/12.2 R |
| 3,929,210 | 12/1975 | Cutler et al. | 191/12.2 R |
| 4,008,791 | 2/1977 | Shafii-Kahany et al. | 191/12.2 R |
| 4,088,275 | 5/1978 | Ramos | 242/615.3 |
| 4,141,438 | 2/1979 | Diem | 191/12.4 |
| 4,384,688 | 5/1983 | Smith . | |
| 4,485,278 | 11/1984 | Schaller et al. | 191/12.4 |
| 4,499,341 | 2/1985 | Boyd | 191/12.4 |
| 4,531,682 | 7/1985 | Schroder et al. | 242/615.3 |
| 4,746,766 | 5/1988 | Soulard | 174/36 |
| 4,757,955 | 7/1988 | Simmons . | |
| 4,846,090 | 7/1989 | Palmquist | 242/677 |
| 4,989,805 | 2/1991 | Burke . | |
| 5,008,487 | 4/1991 | Shimmyo | 174/35 R |
| 5,094,396 | 3/1992 | Burke . | |
| 5,332,171 | 7/1994 | Steff | 242/378 |
| 5,390,695 | 2/1995 | Howard | 242/397.1 |
| 5,551,645 | 9/1996 | Torvund | 242/399 |

FOREIGN PATENT DOCUMENTS

| | | |
|---|---|---|
| 0063313 | 4/1982 | European Pat. Off. . |
| 2549308 | 1/1985 | France . |
| 3518157 | 11/1986 | Germany . |

OTHER PUBLICATIONS

Drawing of Tamra Cord Reel, Tamra Electric Works, Ltd., Japan.
Drawing of Morey Cord Reel, The Morey Corporation, Downers Grove, Illinois.
GTE Cord Reel Assembly in public use prior to Jan. 3, 1995.
GTE Genstar Cord Reel Assembly in public use prior to Jan. 3, 1995.

*Primary Examiner*—John M. Jillions
*Attorney, Agent, or Firm*—Leonard C. Suchyta; Floyd E. Anderson

[57] ABSTRACT

A cord reel assembly is provided which includes a housing including a funnel-shaped port, a spool journalled within the housing, and a cord wound about the spool and having an end portion exiting the housing via the funnel-shaped port. The housing typically includes first and second opposing walls generally perpendicular to an axis of rotation of the spool, and a bridging wall connecting the first and second walls. The funnel-shaped exit port extends outwardly from the bridging wall.

22 Claims, 4 Drawing Sheets

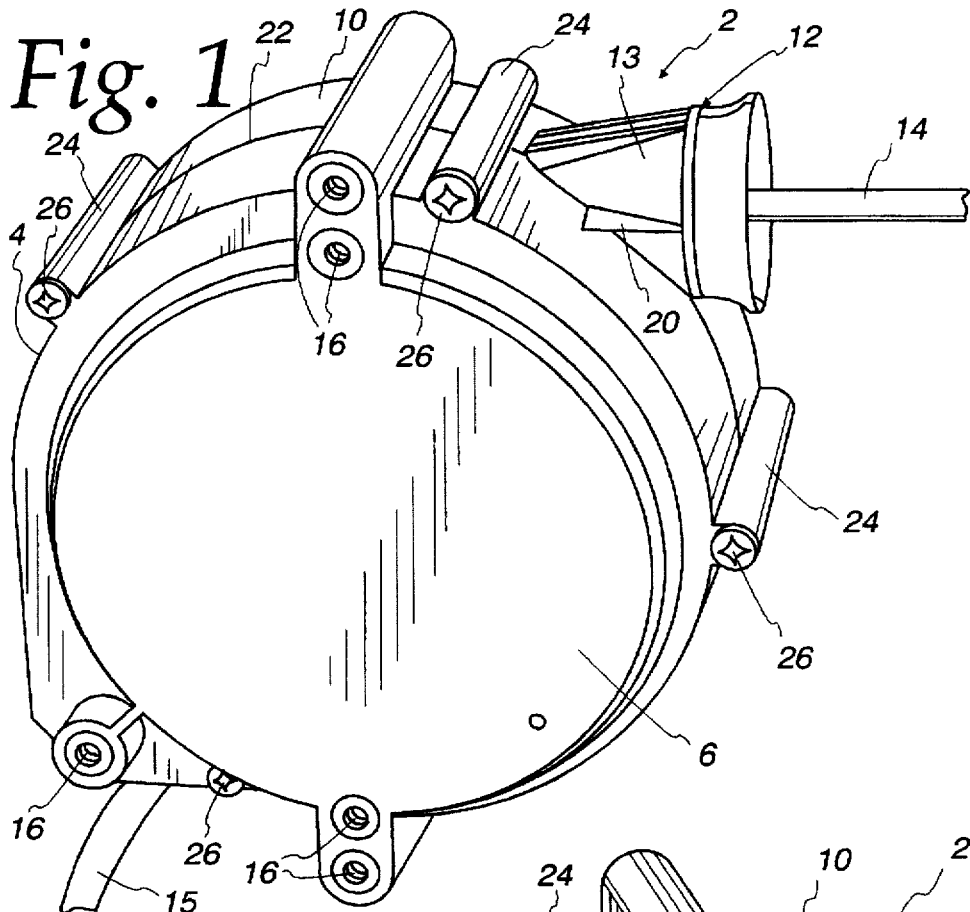
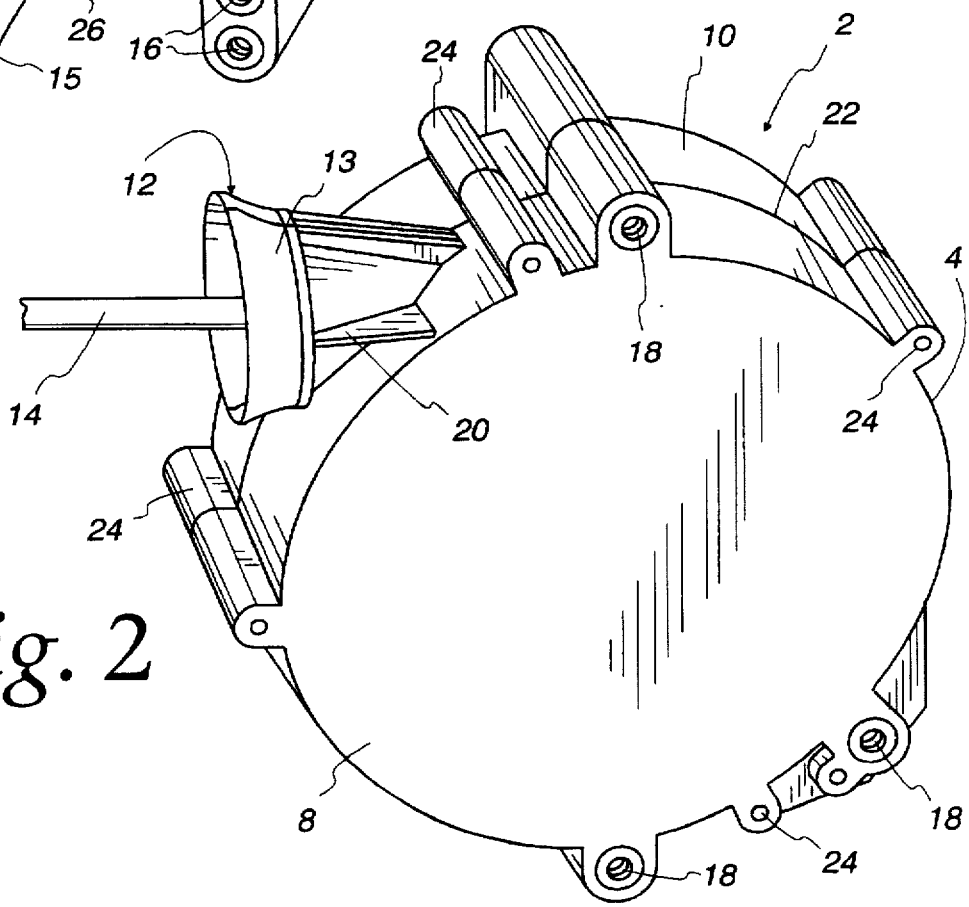

5,732,898

CORD REEL ASSEMBLY

FIELD OF THE INVENTION

The present invention relates to an apparatus for dispensing wire, and, more particularly, to an improved cord reel assembly.

BACKGROUND OF THE INVENTION

A cord reel stores a length of wire in a convenient small housing unit until the wire is needed, at which time a user can pull out the length of wire required by the situation. When the user no longer needs the wire, a spring element inside the cord reel retracts the length of wire back into the housing.

One conventional application of a cord reel is a mechanic's "drop light." Drop lights were often found in auto repair shops hanging from the ceiling just above head height. When a light was needed, a mechanic would grab the drop light and pull the desired amount of electrical cord from the cord reel (attached to the shop ceiling). When the mechanic no longer needed the light, the cord reel would retract the cord. This eliminated the need for many loose wires and extension cords lying on the shop floor which could get tangled or damaged.

The earlier developed cord reels were typically limited to electrical power applications since they relied on electrical brushes and slip rings to achieve electrical continuity between the stationary cord reel housing and rotating cord reel spool. Brushes typically cause short interruptions in continuity due to their sliding nature, which does not usually affect most simple electrical devices as lights and motors, but have a severe detrimental effect on precise equipment such as communication devices. In analog devices, these interruptions appear as noise or static. In digital devices, these interruptions will cause loss of bits of information, which could at times cause data transmission to be incomplete or lost, or worse yet, incorrect.

It was not until the development of the brushless cord reels (e.g., reels which do not use brushes and slip rings) that cord reels became widely used for communication purposes. Instead of brushes, these cord reels have a "stationary" cord bridging the spool and housing, providing uninterrupted, continuous contact throughout cord reel operation. While the usable portion of the cord is extended and retracted, the stationary cord is allowed to coil and uncoil between the rotating spool and stationary housing.

However, even with these modern cord reels, problems can still exist when the cord is retracted through the housing and placed again around the spool. The jacket of the cord can become entangled on the opening to the housing and tear, especially when the cord is pulled with great force. Further, the jacket can often become kinked which may cause the housing to catch the kink prior to the cord being fully retracted.

Further, reels are typically designed to be mounted on one particular platform with the cord reel housing in one particular orientation. It would be useful to have a cord reel which could be placed on various platform configurations with the cord reel housing in more than one possible orientation.

SUMMARY OF THE INVENTION

A cord reel assembly is provided which includes a housing having a funnel-shaped port, a spool journalled within the housing, and a cord wound about the spool. An end portion of the cord exits the housing via the funnel-shaped port. The housing typically includes first and second opposing walls generally perpendicular to an axis of rotation of the spool, and a bridging wall connecting the first and second walls. The funnel-shaped exit port extends outwardly from the bridging wall.

Typically, the axis of symmetry of the exit port is radially offset from the axis of rotation of the spool. The funnel shape typically has an angle with the axis of symmetry ranging from about 15 degrees to 40 degrees.

The cord reel has multiple mounting elements located on both the first and second wall. Thus, the cord reel can be mounted to a mounting component or plate in various arrangements. Further, the mounting elements provide a means for retrofitting the cord reel into existing systems.

The above summary of the presented invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which:

FIG. 1 is a perspective view of a cord reel embodying the present invention with a first wall facing forward;

FIG. 2 is a perspective view of the cord reel in FIG. 1 with a second wall facing forward;

Figure 3:
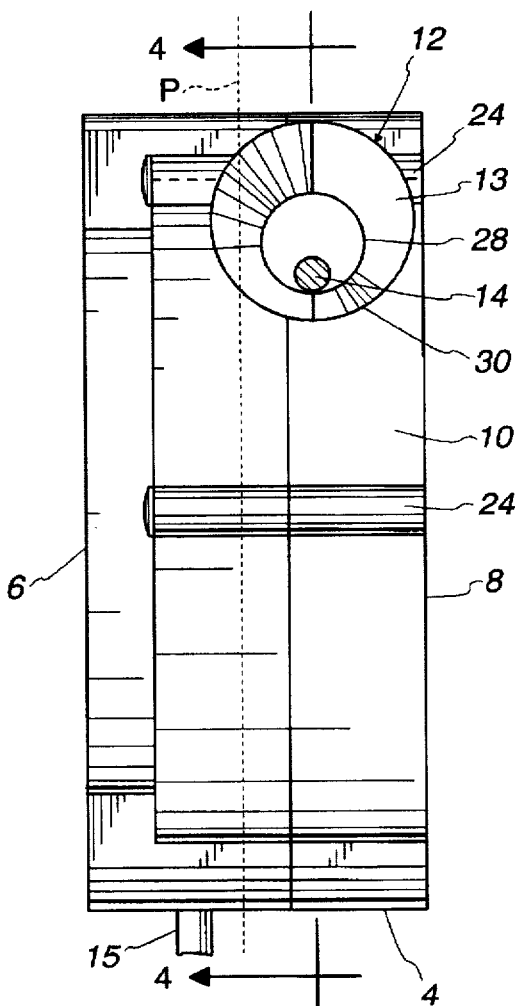
FIG. 3 is a front view of the cord reel looking into the funnel-shaped exit port.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DETAILED DESCRIPTION OF THE PREFERRED EMBODIMENTS

Referring initially to FIGS. 1 and 2, a cord reel 2 with its housing 4 is shown from two angles. In FIG. 1, the housing 4 is shown having a first wall 6 facing forward, while in FIG. 2, a second wall 8 is facing forward. The first wall 6 and the second wall 8 are connected by a bridging structure 10.

An exit port 12 having a funnel or conical shape extends from the bridging structure 10 through which a cord 14 exits. The exit port 12 is formed from a wall 13 protruding from the bridging structure 10. The cord 14 is wound around a spool which is journalled inside the housing 4 and is discussed further below in reference to FIG. 5. The cord 14 electronically couples a device at its terminal end with another device that is connected to wire 15 shown in FIG. 1. Generally, the cord 14 has a multiplicity of wires contained therein and a jacket protecting the wires. The jacket can be made from numerous materials, including metal and various plastics including nylon.

The first wall 6 has a first set of bores 16 (FIG. 1) disposed around its peripheries. Likewise, the second wall 8 has a second set of bores 18 (FIG. 2) disposed around its periphery. As can be seen, there are more bores 16 on the first wall 6 than bores 18 on the second wall 8. The two extra bores within the first set of bores, 16 allows for the retrofitting of the cord reel 2 to numerous existing systems. Typically, all bores 16 and 18 are tapped so that screws can be inserted.

In many existing systems, the mounting platform is on one side of the device, such as a telephone handset, to which the terminal end of the cord attaches. However, many systems also place the mounting platform on the other side of the device. Thus, having bores of both walls 6 and 8 allows the cord reel 2 to be interchangeable with all systems.

The wall 13 of the exit port 12 is attached to the bridging structure 10 by stabilizing ribs 20 located on either side of the exit port 12 as shown in FIGS. 1 and 2. The ribs 20 provide extra support to the exit port 12 as it extends from the housing 4.

Typically, the housing 4 is made from a plastic molding. Because internal components must be placed within the housing 4, the housing 4 is usually formed of two pieces which are connected. FIGS. 1 and 2 show a seam 22 which extends around the housing 4. To maintain the two pieces of the housing 4 in connection, fastening structures 24 are located around the housing 4. Within each fastening structure 24 lies a fastener 26 that connects the two pieces of the housing 4 (FIG. 1).

FIG. 3 is a front view of the cord reel 2 looking into the funnel-shaped exit port 12. The cord 14 is shown in cross-section as it extends in a direction out of the paper. An inner opening 28 of the exit port 12 which is formed by the intersection of wall 13 with the bridging structure 10 is illustrated. An outer opening 30 is also shown which is defined by the outermost edge of the wall 13. Because of recoiling elements in the housing 4, the exit port 12 is offset from the center line of the housing 4. However, a portion of the wall 13 forming the exit port 12 usually extends over an imaginary plane P (shown by dotted lines in FIG. 3) equidistant from the first wall 6 and the second wall 8.

Figure 4:
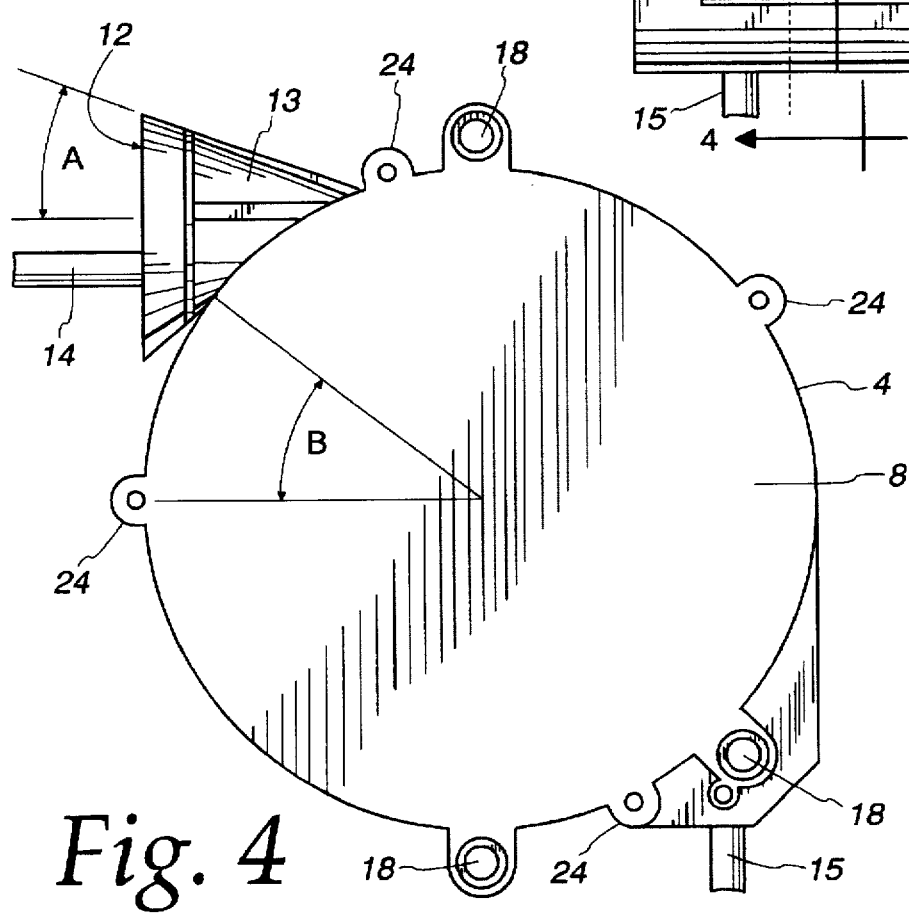
FIG. 4 is a side view of the cord reel.

In FIG. 4, the angle A of the wall 13 with respect to an axis of symmetry in the exit port 12 is shown. Typically, angle A is in the range from about 15 degrees to about 40 degrees. An angle B represents the angle between the horizontal and a point at which the lower segment of the wall 13 intersects the bridging structure 10. Angle B is in the range from about 25 degrees to about 45 degrees and in the preferred embodiment is approximately 35 degrees. Thus, the axis of symmetry of the exit port 12 is radially offset from the axis of rotation of the spool typically by a distance greater than the radius of the spool. The spool is discussed in more detail below in reference to FIG. 5. The axis of symmetry of the exit port 12 is also generally tangential to the bridging structure 10.

The cord 14 can be drawn from the housing 4 smoothly due to the funnel shape of the exit port 12. Thus, if there is any misalignment between the cord reel 2 and the device to which it is electronically coupled, the cord 14 can extend outwardly while not being subjected to any sharp angles which may damage it. As the device to which the cord 14 attaches moves away from the cord reel 2, additional misalignment can be compensated for. That is to say that the angle A allows for a device to be further spaced from the axis of symmetry of the exit port 12 as the length of cord 14 outside of the exit port 12 increases.

The funnel shape of the exit port 14 also allows the cord 14 to be guided to the center of the spool in the housing 4 more easily. This inhibits the cord 14 from being wound only around one side of the spool which may cause the spool to jam. When the cord 14 is guided to the center of the spool, the cord 14 tends to be evenly wound around the entire length of the spool.

As the cord 14 begins to wear, its jacket may have imperfections especially if it made of a material like nylon. These imperfections may catch on sharp corners which the funnel-shaped exit port 12 tends to minimize. Further, the cord 14 may become "kinked" as it used which the funnel helps to "unwind" as the cord 14 is retracted into the housing 4.

Figure 5:
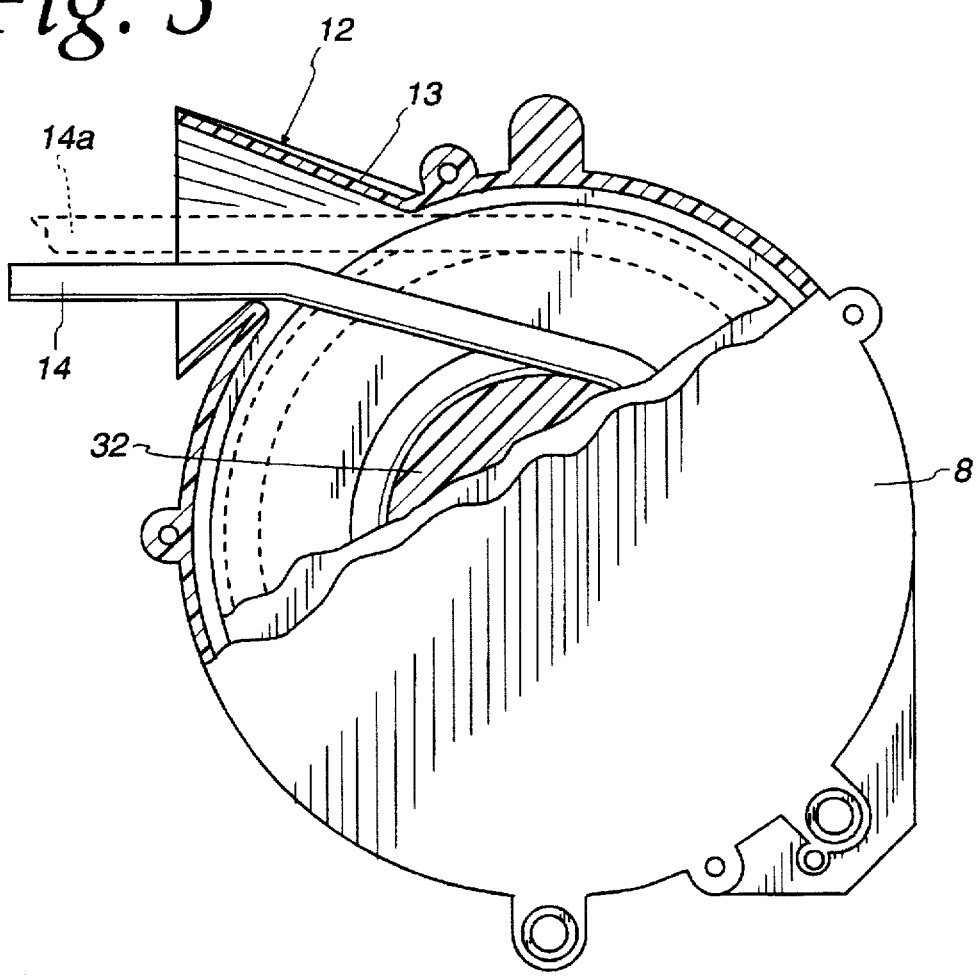
FIG. 5 is a side view of the cord reel with the second wall partially removed to reveal the internal components of the cord reel.

FIG. 5 reveals the internal components of the cord reel 2 by partially cutting away the second wall 8 of the housing 4. The cord 14 is shown wound about a spool 32 which is journalled with the housing 4. When most of the cord 14 is wound about the spool 32, the thickness of the wound cord 14 around the spool 32 expands and is represented by the phantom line cord 14a. The housing 4 also includes some type of recoiling mechanism which retracts the cord 14 automatically when the cord 14 has been extended. This recoiling mechanism typically incorporates some type of spring element in conjunction with a ratchet mechanism.

Also, because of the electrical communication occurring, the housing 4 is often coated with EMI coatings to reduce the interference with the signals being transmitted by the cord 14. Further details of the cord reel are disclosed in U.S. patent application Ser. No. 08/298,192, filed on Aug. 31, 1994, entitled "CORD REEL ASSEMBLY", now U.S. Pat. No. 5,535,960, which is herein incorporated by reference in its entirety.

The funnel-shaped exit port 14 is superior to other structures through which the cord 14 may exit. For example, a simple exit hole in the bridging structure 10 would expose the internal components to the environment, including dust and other particles. It would also have sharp corners on which imperfections of the jacket of the cord 14 may catch. A kinked cord also may catch more easily on such an opening.

A large cylindrical exit port may be used but would also permit the entrance of particles and dust. Furthermore, it would not provide the smooth guidance for the cord 14 as provided by the funnel-shaped exit port 14. This may be problematic if the size of the large cylindrical exit port is larger than a kink in the cord 14. And, a large cylindrical exit port would not guide the cord 14 towards the center of the housing 4 at the spool 32.

A small cylindrical port may inhibit the flow of particles into the housing 4, but it would not compensate for any misalignment as the funnel shape accomplishes. Further, it is more likely to catch and damage the cord 14 when it is being retracted, especially when the jacket of the cord 14 has imperfections or is kinked.

Figure 6:
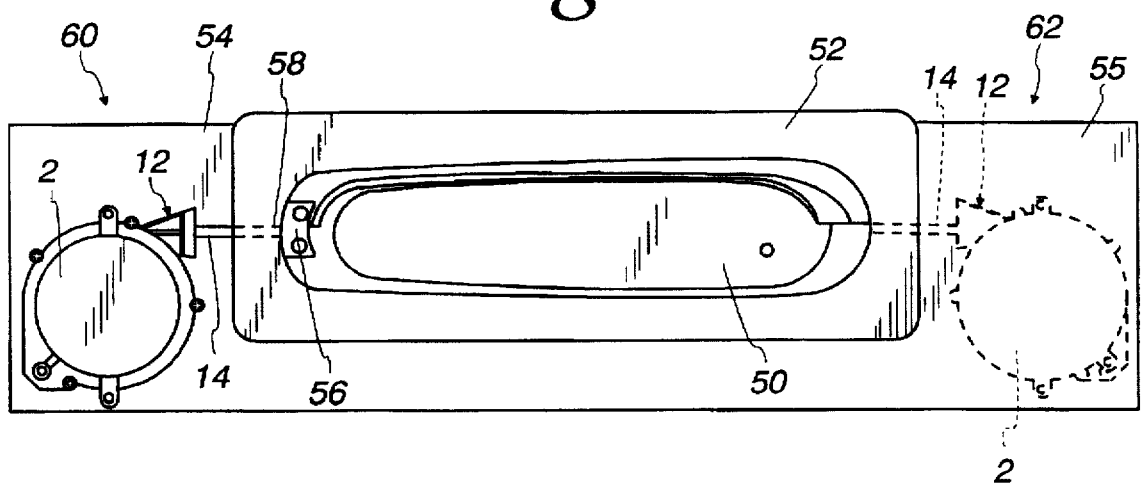
FIG. 6 is a side view of an arrangement including the cord reel positioned in two configurations around a telephone handset and holder, one of the configurations being depicted with solid lines and the other of the configurations being depicted with phantom lines.

FIG. 6 illustrates the cord reel 2 for use with a telephone handset 50. The handset 50 is placed into a handset holder or bezel 52 which has a mounting plate 54 or 55 on either side thereof. The handset 50 typically has a socket 56 at one end into which the terminal end 58 of the cord 14 is plugged.

The cord reel 2 can be mounted in two arrangements one of which is shown in solid lines while the other in phantom lines in FIG. 6. In the first arrangement 62, the cord reel 2 has its second wall 8 against mounting plate 54. Thus, the second set of bores 18 (FIG. 2) is used for mounting the cord reel 2 to the mounting plate 54. In the second arrangement 62 (shown in phantom lines), the first wall 6 (FIG. 1) is positioned against the mounting plate 55. Here, the first set of bores 16 is used to mount the cord reel 2 to mounting plate 55. As can be seen, in either arrangement 60 or 62, the cord 14 exits the exit port 12 horizontally to connect with the handset 50.

Figure 7:
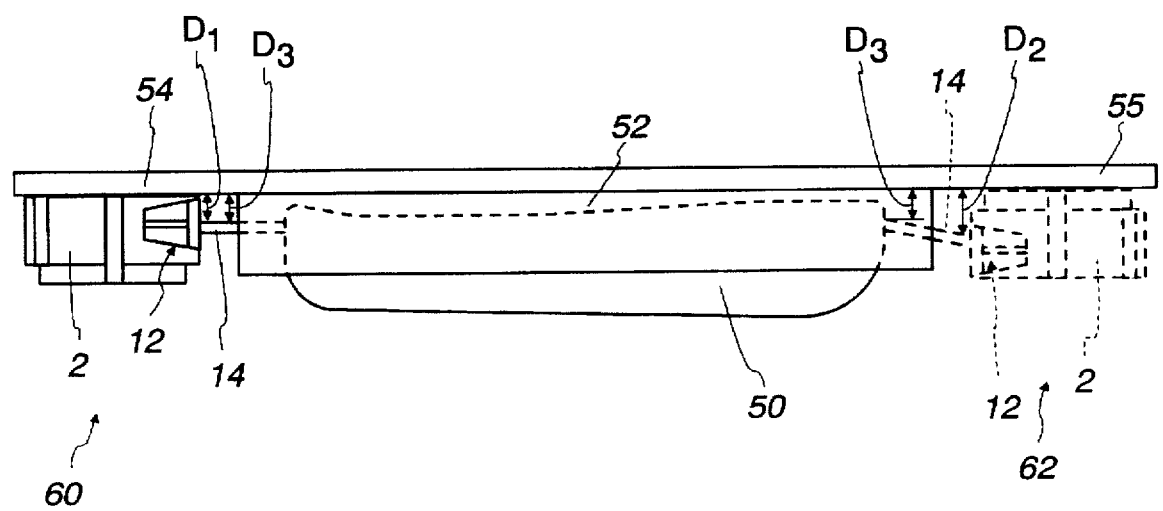
FIG. 7 is a top view of the cord reel arrangement in FIG. 6.

FIG. 7 is a top view of the cord reel arrangement in FIG. 6 and illustrates another benefit of the funnel-shaped exit port 12 on the cord reel 2. Because the exit port 12 is offset from the center of the housing 4, the distance $D_1$ between the exiting of the cord 14 at the exit port 12 and the mounting plate 54 in arrangement 60 is much less than the distance $D_2$ between the exiting cord 14 at the exit port 12 and the mounting plate 55 in arrangement 62. A distance $D_3$ between the terminal end of the cord 14 at the handset 50 is the same in both configurations 60 and 62. The funnel-shaped exit port 12 allows for the cord 14 to smoothly exit the housing 4 in configuration 62.

As seen from FIGS. 6 and 7, the funnel-shaped exit port 12 in the first configuration 60 is opposite to the funnel-shaped exit port 12 in the second configuration 62. Thus, the cord 14 extends generally in an opposite direction in the two configurations 60 and 62.

Generally, the two mounting plates 54 and 55 are coplanar. As such, the first wall 6 in the first orientation 60 is approximately coplanar with the second wall 8 in the second orientation 62. Further, if a first imaginary plane includes the axes of rotation of the spool 32 in both configurations 60 and 62 as seen in FIG. 6, and a second imaginary plane includes the axes of symmetry of the exit port 12 in both configurations 60 and 62 as seen in FIG. 6, then the first and second imaginary planes would be substantially parallel.

While there has been shown and described herein what are presently considered the preferred embodiments of the present invention, it will be obvious to those skilled in the art that various changes and modifications can be made therein without departing from the scope of the present invention as defined by the appended claims.

What is claimed is:

1. A cord reel, comprising:
   a housing having first and opposing second walls, each wall having a mounting element, said housing including a funnel-shaped exit port having a narrow end and a wide end, said funnel-shaped exit port flaring outwardly from said narrow end to said wide end;
   a spool journalled within said housing;
   a cord wound about said spool and having an end portion exiting said housing via said funnel-shaped exit port, said cord having a plurality of electrical conducting wires surrounded by an outer jacket; and
   wherein an axis of symmetry of said funnel-shaped exit port is located to one side of an imaginary plane equidistant from said first and second opposing walls.

2. The cord reel of claim 1, wherein said first and second opposing walls generally perpendicular to an axis of rotation of said spool, and a bridging wall connecting said first and second walls, said funnel-shaped exit port extending outwardly from said bridging wall.

3. The cord reel of claim 2 wherein said axis of symmetry of said funnel-shaped exit port which is radially offset from said axis of rotation of said spool.

4. The cord reel of claim 3, wherein said axis of symmetry of said funnel-shaped exit port is generally tangential to said bridging wall.

5. The cord reel of claim 3, wherein said axis of symmetry of said funnel-shaped exit port is radially spaced from said axis of rotation of said spool by a distance greater than a radius of said spool.

6. The cord reel of claim 1, wherein said funnel-shaped exit port includes a wall intersecting said imaginary plane.

7. The cord reel of claim 1, wherein said funnel-shaped exit port includes a wall forming an angle with said axis of symmetry of said funnel-shaped exit port, said angle ranging from about 15 degrees to about 40 degrees.

8. The cord reel of claim 2, further including structural ribs connecting said funnel-shaped exit port to said bridging wall.

9. The cord reel of claim 2, wherein a lowermost portion of said funnel-shaped exit port nearest to said axis of rotation of said spool intersects said bridging wall at a point, an imaginary line drawn between said point and said axis of rotation of said spool forming an angle with a horizontal line, said angle ranging from about 25 degrees to about 45 degrees.

10. A cord reel mounting arrangement, comprising:
    a housing including a funnel-shaped exit port;
    a spool journalled within said housing; and a cord wound about said spool and having an end portion exiting said housing via said funnel-shaped exit port, said cord having a plurality of electrically conducting wires surrounded by an outer jacket, said housing having first and second walls generally perpendicular to an axis of rotation of said spool, said first and second walls including respective first and second mounting elements for mounting said housing to respective first and second mounting plates, wherein an axis of symmetry of said funnel-shaped exit port is located to one side of an imaginary plane equidistant from said first and second opposing walls and,
    wherein said first wall bears against said first mounting plate in a first orientation, and wherein said second wall bears against said second mounting plate in a second orientation.

11. The cord reel mounting arrangement of claim 10, wherein said cord in said first orientation extends from said exit port in a first direction, and wherein said cord in said second orientation extends from said exit port in a second direction, said first direction being generally opposite to said second direction.

12. The cord reel mounting arrangement of claim 10, wherein said first and second mounting elements each include threaded bores.

13. The cord reel mounting arrangement of claim 10, wherein said cord is generally along an axis of symmetry of said funnel-shaped exit port in said first orientation.

14. The cord reel mounting arrangement of claim 13, wherein said cord forms an angle with said axis of symmetry of said funnel-shaped exit port in said second orientation.

15. The cord reel mounting arrangement of claim 10, wherein said first wall in said first orientation is generally coplanar with said second wall in said second orientation.

16. The cord reel mounting arrangement of claim 10, wherein said funnel-shaped exit port in said first orientation generally opposes said funnel-shaped exit port in said second orientation.

17. The cord reel mounting arrangement of claim 10, wherein an axis of rotation of said spool in said first orientation and an axis of rotation of said spool in said second orientation lie in a first imaginary plane, and an axis of symmetry of said exit port in said first orientation and an axis of symmetry of said exit port in said second orientation lie in a second imaginary plane, said first and second imaginary planes being substantially parallel to each other.

18. A telephone cord reel mounting arrangement, comprising:

a telephone cord reel including a housing having a funnel-shaped exit port, a spool journalled within said housing, and a telephone cord having a plurality of electrically conducting wires surrounded by an outer jacket wound about said spool and having an end portion exiting said housing via said funnel-shaped exit port, said housing having first and second walls generally perpendicular to an axis of rotation of said spool, wherein an axis of symmetry of said funnel-shaped exit port is located to one side of an imaginary plane equidistant from said first and second opposing walls and, said first and second walls including respective first and second mounting elements;

a telephone handset holder;

a telephone handset disposed in said telephone handset holder;

a mounting plate disposed on either side of said telephone handset holder; and wherein said first wall of said housing bears against and said first mounting element engages said mounting plate when said housing is disposed on one side of said telephone handset holder, and wherein said second wall of said housing bears against and said second mounting element engages said mounting plate when said housing is disposed on the other side of said telephone handset holder.

19. The telephone mounting arrangement of claim 18, wherein said funnel-shaped exit port includes a wall forming an angle with an axis of symmetry of said funnel-shaped exit port, said angle ranging from about 15 degrees to about 40 degrees.

20. A method of mounting a cord reel to a mounting component having either a first or second mounting configuration, said method comprising the steps of:

supplying said cord reel including a housing having a funnel-shaped exit port, a spool journalled within said housing, and a cord having a plurality of electrically conducting wires surrounded by an outer jacket wound about said spool and having and end portion exiting said housing via said funnel-shaped exit port, said housing having first and second walls generally perpendicular to an axis of rotation of said spool, wherein an axis of symmetry of said funnel-shaped exit port is located to one side of an imaginary plane equidistant from said first and second opposing walls and, said first and second walls including respective first and second mounting elements;

determining whether said first or second mounting configuration is present;

positioning said cord reel against said mounting component according to said configuration; and using said first mounting elements to mount said cord reel with said first wall of the housing against said mounting component in said first configuration, or using said second mounting elements to mount said cord reel with said second wall of the housing against said mounting component in said second configuration.

21. The method of claim 20, wherein said funnel-shaped exit port includes a wall forming an angle with an axis of symmetry of said funnel-shaped exit port, said angle ranging from about 15 degrees to about 40 degrees.

22. The method of claim 20, wherein said first wall in said first configuration is generally coplanar with said second wall in said second configuration.

* * * * *